US010237066B1

(12) United States Patent
Langhammer et al.

(10) Patent No.: US 10,237,066 B1
(45) Date of Patent: Mar. 19, 2019

(54) MULTI-CHANNEL ENCRYPTION AND AUTHENTICATION

(71) Applicant: Altera Corporation, San Jose, CA (US)

(72) Inventors: Martin Langhammer, Salisbury (GB); Shawn Nicholl, Paradise (CA); Cheng Wang, Paradise (CA)

(73) Assignee: ALTERA CORPORATION, San Jose, CA (US)

( * ) Notice: Subject to any disclaimer, the term of this patent is extended or adjusted under 35 U.S.C. 154(b) by 626 days.

(21) Appl. No.: 14/247,597

(22) Filed: Apr. 8, 2014

Related U.S. Application Data

(60) Provisional application No. 61/840,179, filed on Jun. 27, 2013.

(51) Int. Cl.
*H04L 9/14* (2006.01)
(52) U.S. Cl.
CPC ............ *H04L 9/14* (2013.01); *H04L 2209/24* (2013.01)
(58) Field of Classification Search
CPC .. G06F 21/72; G06F 21/10; G06F 2221/2107; H04L 63/0428; H04L 9/08
USPC .......... 380/28–30, 44–47, 255–286; 713/150–154, 160–167, 189–193
See application file for complete search history.

(56) References Cited

U.S. PATENT DOCUMENTS

| 8,681,974 | B1 | 3/2014 | Langhammer | |
|---|---|---|---|---|
| 2002/0041685 | A1* | 4/2002 | McLoone | H04L 9/0625 380/45 |
| 2009/0060197 | A1* | 3/2009 | Taylor | H04L 9/0618 380/277 |
| 2010/0250409 | A1 | 9/2010 | Savage et al. | |

* cited by examiner

*Primary Examiner* — Evans Desrosiers
(74) *Attorney, Agent, or Firm* — Fletcher Yoder, P.C.

(57) ABSTRACT

A scalable and efficient cryptographic architecture is provided for processing data using deeply-pipelined algorithms and circuitries. The architecture can be implemented as circuitry in a fixed logic device, or can be configured into a programmable integrated circuit device. The same top-level design may be used for different choices of data channels, processing depth, parallelism level, and/or system throughput. An encryption pipeline processing block performs rounds of processing upon a block of said data using an encryption process and receives a respective round encryption key for each round of processing. An encryption key pipeline block provides the respective round encryption key for each round of processing by selecting, for each round of processing, the respective round encryption key from at least a first round encryption key corresponding to a first channel and a second round encryption key corresponding to a second channel.

21 Claims, 5 Drawing Sheets

MULTI-CHANNEL ENCRYPTION AND AUTHENTICATION

CROSS REFERENCE TO RELATED APPLICATION

This patent application claims the benefit of, and priority to, U.S. Provisional Application No. 61/840,179, filed Jun. 27, 2013, the disclosure of which is hereby incorporated by reference herein in its entirety.

FIELD

The present disclosure relates generally to cryptography. More specifically, the present disclosure relates to encryption and/or authentication architectures for implementing cryptographic algorithms.

BACKGROUND

Many applications involve securing data using high-performance cryptographic algorithms, such as encryption/decryption algorithms usually in conjunction with message authentication. One common cryptographic encryption/decryption algorithm is a symmetric key block cipher algorithm adopted by the Department of Commerce, National Institute of Standards and Technology (NIST) as its Advanced Encryption Standard (AES). (See detailed specification in "Federal Information Processing Standards Publication 197" (FIPS 197), of Nov. 26, 2001, incorporated herein by reference in its entirety, hereinafter referred to as the AES specification.) Older FIPS-approved symmetric block ciphers include the Data Encryption Standard (DES) and triple-DES.

Several modes may be used to encrypt and/or authenticate data. Some of these modes are described in the NIST Special Publication (SP) 800-38A, of 2001, entitled "Recommendation for Block Cipher Modes of Operation," and incorporated herein by reference in its entirety. Yet another mode of operation, called Galois/Counter Mode (GCM), is a block cipher mode of operation that uses universal hashing over a binary Galois field to provide authenticated encryption. GCM takes a plaintext bit string as an input and combines it with an initialization vector (IV) to produce an encrypted bit string (i.e., ciphertext) and an authentication tag, where the ciphertext is the same length as the original plaintext. A variant of GCM used to generate a Message Authentication Code for unencrypted data is called GMAC. A description of GCM and GMAC can be found in NIST SP 800-38D, of November 2007, entitled "Recommendation for Block Cipher Modes of Operation: Galois/Counter Mode (GCM) and GMAC," incorporated herein by reference in its entirety.

A further additional mode of operation, XTS, stands for XEX-based Tweaked codebook mode with ciphertext Stealing, where "XEX" is from "XOR-Encrypt-XOR". In XTS, a tweakable block cipher E operates on a message M, a key K, and two tweak values i and j, to produce a ciphertext C. The tweak values may operate like an IV but may have different security properties: an IV is generally random, whereas a tweak doesn't have to be. An encryption key provides security against an adversary recovering the plaintext and must remain secure, whereas a tweak aims to provide variability of the ciphertext and the tweakable block cipher remains secure even if the tweak values are known. For XTS-AES, for example, data units are divided into 128-bit blocks and each data unit is assigned two tweak values that are non-negative integers. The tweak values may be assigned consecutively, starting from an arbitrary non-negative integer. A description of XTS-AES can be found in NIST SP 800-38E, entitled "Recommendation for Block Cipher Modes of Operation: The XTS-AES Mode for Confidentiality on Storage Devices," of January 2010, incorporated herein by reference in its entirety.

Many high-speed hardware implementations of cryptographic algorithms such as the algorithms discussed above use pipelining and/or unrolling to speed up cryptographic processing. But, while pipelining and/or unrolling certain cryptographic algorithms may make for an easier-to-route, higher-performance hardware core, these techniques often make the interface timing very restrictive. Also, the input and output words of such implementations typically need to interface to the hardware core within a fixed time. This inflexibility may make the hardware core very difficult to use, and in some cases, result in a slower and/or larger system than if discrete hardware cores had been used for individual encryption processes. Another limitation of many high-speed hardware implementations of cryptographic algorithms is their limited capability to handle data incoming from multiple channels. Such a capability is increasingly important in modern transmission systems that carry data at a high rate and in parallel. Yet another limitation of many high-speed hardware implementations of cryptographic algorithms is the lack of scalability of these implementations as higher throughputs, different speed grades, and/or different target devices are required.

SUMMARY

The present disclosure relates to systems and methods for providing encryption and/or authentication architectures for processing data incoming from multiple channels. These architectures can be implemented as circuitry in a fixed logic device, or can be configured into a programmable integrated circuit device such as a programmable logic device (PLD).

Therefore, in accordance with embodiments of the present invention, systems and methods are provided for processing data using deeply-pipelined algorithms and circuitries. In one embodiment, a scalable and efficient cryptographic architecture may be implemented as circuitry in a fixed logic device, or may be configured into a programmable integrated circuit device. The same top-level design may be used for different choices of data channels, processing depth, parallelism level, and/or system throughput.

In one embodiment, circuitry for processing data incoming from at least a first channel and a second channel is provided. The circuitry includes an encryption pipeline processing block for performing rounds of processing upon a block of said data using an encryption process. The encryption pipeline processing block receives a respective round encryption key for each round of processing upon the block of data. The circuitry also includes an encryption key pipeline block for providing the respective round encryption key for each round of processing upon the block of data. The encryption key pipeline block provides a round encryption key by selecting, for each round of processing, the respective round encryption key from at least a first round encryption key corresponding to the first channel and a second round encryption key corresponding to the second channel.

In some embodiments, a width of the encryption key pipeline block corresponds to a total number of channels from which data is incoming and a length of the encryption key pipeline block corresponds to a total number of the plurality of rounds of processing of said block of data.

The encryption key pipeline block may include a first selection circuitry corresponding to the first channel and having a first control input, a second selection circuitry corresponding to the second channel and having a second control input, and a channel control pipeline for propagating a channel control signal to the first control input of the first selection circuitry in a first stage and to the second control input of the second selection circuitry in a second stage. The encryption key pipeline block may further include a first working key storage circuitry for storing a first working key and a second working key storage circuitry for storing a second working key, a first staged key storage circuitry for storing a first staged key and a second staged key storage circuitry for storing a second staged key, and a key control pipeline for propagating a key switch control signal for propagating the first staged key from the first staged key storage circuitry into the first working key storage circuitry at a first switching time and propagating the second staged key from the second staged key storage circuitry into the second working key storage circuitry at a second switching time.

In some embodiments, the circuitry further includes an authentication pipeline processing block for performing authentication rounds upon said data block. The authentication pipeline processing block may receive a respective hash key value for each authentication round upon said data block. The circuitry may further include an authentication key pipeline block for providing the respective hash key value for each authentication round upon said data block, by selecting, for each authentication round, the respective hash key value from at least a first hash key value corresponding to the first channel and a second hash key value corresponding to the second channel. The authentication key pipeline block may include a first set of storage circuitries for storing a plurality of powers of a first hash key value corresponding to the first channel and a second set of storage circuitries for storing a plurality of powers of a second hash key value corresponding to the first channel.

The circuitry may further include a tweak pipeline block for generating a first tweak value corresponding to the first channel and a second tweak value corresponding to the second channel, a first tweak storage circuitry for storing the first tweak value, and a second tweak storage circuitry for storing the second tweak value.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

Known encryption and/or authentication systems may be too slow and/or too large to support multichannel applications. According to one aspect of this disclosure, deeply-pipelined encryption and/or authentication algorithms and circuitries are described. Multiple independent channels may exist in the encryption and/or authentication pipeline(s) simultaneously. Any cryptographic channel setup (e.g., encryption and authentication keys, XTS tweak values, authentication initialization values, etc.) may be switched with zero latency without affecting the processing of a data block in the same channel, or any other channel. In some embodiments, the hash information for a particular channel may be partially consolidated during switchover of the cryptographic channel setup, and can be completed at any time during independent processing of data from the following channel.

Figure 1:
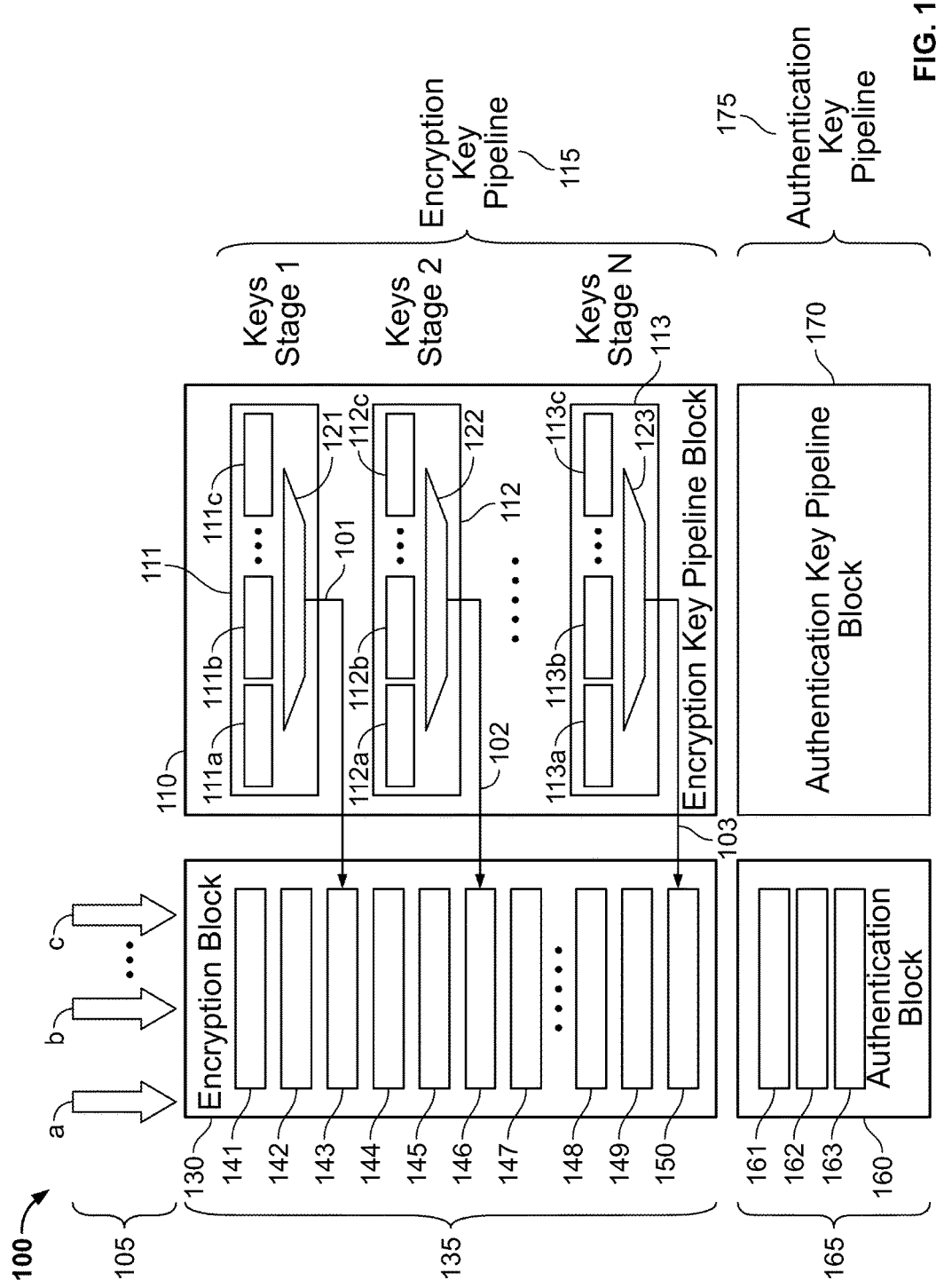
FIG. 1 is a block diagram of an encryption and authentication core architecture according to some embodiments.

FIG. 1 is a block diagram of an encryption and authentication core architecture 100 according to some embodiments. Architecture 100 includes an encryption pipeline processing block 130 and an encryption key pipeline block 110. Architecture 100 also includes an authentication pipeline processing block 160 and an authentication key pipeline block 170. As shown, architecture 100 processes data incoming from a plurality of channels 105, of which only three channels are shown as channels a, b, and c.

Channels 105 may correspond to any physical link through which data in any suitable form is communicated. In some embodiments, channels 105 are physical channels carrying information between nodes in any suitable communication network such as a wireless network, a local- or wide-area network including an intranet or the Internet, and an optical fiber network, via any suitable protocol, such as Transmission Control Protocol (TCP/Internet Protocol (IP), or Optical Transport Network (OTN).

Starting with the encryption aspect of architecture 100, encryption pipeline processing block 130 implements an encryption pipeline 135 having a plurality of processing rounds 141 through 150. Each of these processing rounds includes one or more operations to be applied to a data block incoming from any one of the channels 105. The data block may have a predetermined length, e.g., as specified by a cryptographic algorithm being used in the encryption pipeline processing block 130, or the data block length may be adjusted depending, e.g., on system- or user-specific parameters. Each round of processing rounds (or sub-round) 141 through 150 may include one or more processing steps which may be similar or different for different stages. These steps may be implemented in hardware and/or software. In some implementations, multiple processing rounds implement one round of the cryptographic algorithm (e.g., AES) being applied.

In one illustrative implementation, encryption pipeline 135 is an AES encryption pipeline with a 256-bit encryption key, and each of processing rounds 141 through 150 corresponds to a cryptographic operation as described in the AES specification. For example, each sub-round 141 through may implement a desired processing operation upon the data block, such as a substitute-bytes transformation ("SubBytes"), a shift-rows transformation ("ShiftRows"), a mix-columns transformation ("MixColumns"), and/or an add-round-key transformation ("AddRoundKey"), e.g., as described in the AES specification. For example, processing rounds 141, 142, and may apply one or more of these transformations so that the three rounds of processing 141, 142, and 143 implement a first AES round; processing rounds 144, 145, and 146 may implement the second AES round; and so on. Pipelining may be used between the processing rounds (or sub-rounds) to increase speed. These transformations may be hardware-implemented such as using look-up tables, block-wide XOR logic blocks, registers, ROM memories, synthesized logic or any other suitable hardware component. These transformations may alternatively or additionally be implemented in software.

Some sub-rounds, e.g., 143 and 146 as shown in FIG. 1, may process data based on an encryption key. For example, these processing rounds may involve combining a round key or subkey with an encryption state. The round key may be derived from a main encryption key, using, for example, a key expansion algorithm such as Rijndael key schedule. Each round key may have the same size as the state and be added by combining each byte of the state with the corresponding byte of the round key using bitwise XOR. A set of reverse rounds may be applied to transform ciphertext back into the original plaintext using the same encryption key.

To provide the appropriate encryption key to the encryption pipeline processing block 130, encryption key pipeline block 110 implements an encryption key pipeline 115. This encryption key pipeline 115 may include N key stages 111 through 113, and provide keys to the particular rounds of processing (or sub-rounds) in the encryption pipeline 135 that involve transforming data with a key. In the AES example above, where N is 14, each key stage i (i=1, . . . , N=14) provides a round key to an appropriate one of the processing round 143, 146, through 150.

As shown in the example of FIG. 1, key stage circuitry 111 provides round key 101 to processing round 143. This round key 101 is selected using selection circuitry 121 from a plurality of channel key provider circuitries 111a, 111b, through 111c. Each of these channel key provider circuitries may correspond to one channel. In the example shown, circuitry 111a provides a round key for channel a, circuitry 111b provides a round key for channel b, and circuitry 111b provides a round key for channel c. Channel key provider circuitries 111a, 111b, and 111c may be implemented using separate or shared registers, a larger memory unit, or in ay suitable way. One detailed exemplary implementation of encryption key pipeline 115 is discussed below in connection with FIG. 2. Selection circuitry 121 may be implemented using multiplexers, logic components, look-up tables, or any suitable circuitries.

Key stage circuitry 112 may operate similarly to key stage circuitry 111, providing round key 102 to processing round 146 from a selected one of key provider circuitries 112a, 112b, through 112c, using selection circuitry 122. Key stage circuitry 113 may operate similarly to key stage circuitry 111, providing round key 103 to processing round 150 from a selected one of key provider circuitries 113a, 113b, through 113c, using selection circuitry 123.

In FIG. 1, the width of the encryption key pipeline block 110 may correspond to the total number of channels a through c from which data is incoming, as reflected by the number of key provider circuitries being used in each key stage circuitry. A length of the encryption key pipeline block may correspond to a total number of rounds of processing of said block of data, as reflected by the number of encryption rounds being implemented and/or the number of key stage circuitries being used.

Turning to the authentication aspect of architecture 100, authentication pipeline processing block 160 may implement an authentication pipeline 165 for authenticating the data block incoming from one of the channels 105 or the encryption pipeline processing block 130. The authentication pipeline processing block 160 may implement any suitable authentication process, for example, GCM which takes a plaintext bit string as an input and combines it with an initialization vector (IV) to produce an encrypted bit string (i.e., ciphertext) and an authentication tag, where the ciphertext is the same length as the original plaintext. GCM also allows additional authenticated data (AAD), which is not encrypted, to contribute to the tag value. GCM-authenticated encryption is typically performed on fixed-length (e.g., 128-bit) blocks using a block cipher authentication key. The authentication key may be separate from the encryption key (e.g., used in the encryption pipeline 135) and the IV is typically changed for every bit string and is not repeated for a given key; otherwise an adversary could easily extract the hash subkey. Because the probability of ciphertext forgery increases with the sizes of the plaintext and AAD, it is desirable to encrypt and/or authenticate over smaller bit strings. One GCM embodiment uses a 96-bit IV, a 256-bit key size, and a 128-bit authentication tag. Such a key size and an authentication tag size are usually set to provide a desired level of security.

As shown in FIG. 1, authentication pipeline processing block 160 includes three authentication rounds 161, 162, and 163 for processing the data block based on a respective round authentication key for each round of authentication. The authentication pipeline processing block may compute an authentication tag for the AES-encrypted data block output from encryption pipeline processing block 130, iteratively over the authentication rounds 161 through 163.

An authentication key pipeline 175 is implemented using authentication key pipeline block 170 for providing the respective round authentication key for each round of processing upon the data block. Like the encryption key pipeline block 110, authentication key pipeline block 170 may be implemented using multiple stages of channel key selection, so that an authentication round processing upon a data block incoming from a channel receives an authentication key corresponding to the right channel.

Although both encryption and authentication pipelines are shown in FIG. 1, it should be understood that only one of those pipelines may be used or they may be used in inverse order, as appropriate. For example, in some embodiments, only encryption pipeline 135 may be implemented, e.g., with architecture 100 including only encryption pipeline processing block 130 and encryption key pipeline block 110. In other embodiments, only authentication pipeline 165 may be implemented, e.g., with architecture 100 including only authentication pipeline processing block 160 and authentication key pipeline block 170. In some embodiments, the authentication pipeline may be first applied, followed by the encryption pipeline. Other modifications may be made, without departing from the scope of this disclosure. For example, although FIG. 1 mainly discusses AES embodiments with a 256-bit cipher key, it should be understood that concepts described herein are applicable to other key lengths and block sizes as well as to other cryptographic algorithms and modes of operation. Also, although only three channels are illustrated in FIG. 1, it should be understood that a higher or lower number of channels could be used, without departing from the scope of this disclosure. Similarly the numbers of stages, key provider circuitries and key stage circuitries in FIG. 1 are only illustrative and not limiting and can be changed without departing from the scope of this disclosure.

In some embodiments, deep pipelining of encryption and/or authentication processes, as shown in FIG. 1, is supported by initializing one or more components of the architecture to store and/or prepare to provide inputs to the associated pipeline(s) before data is actually processed in the associated pipeline(s) using these inputs. Examples of such components are discussed in further detail below.

Figure 2:
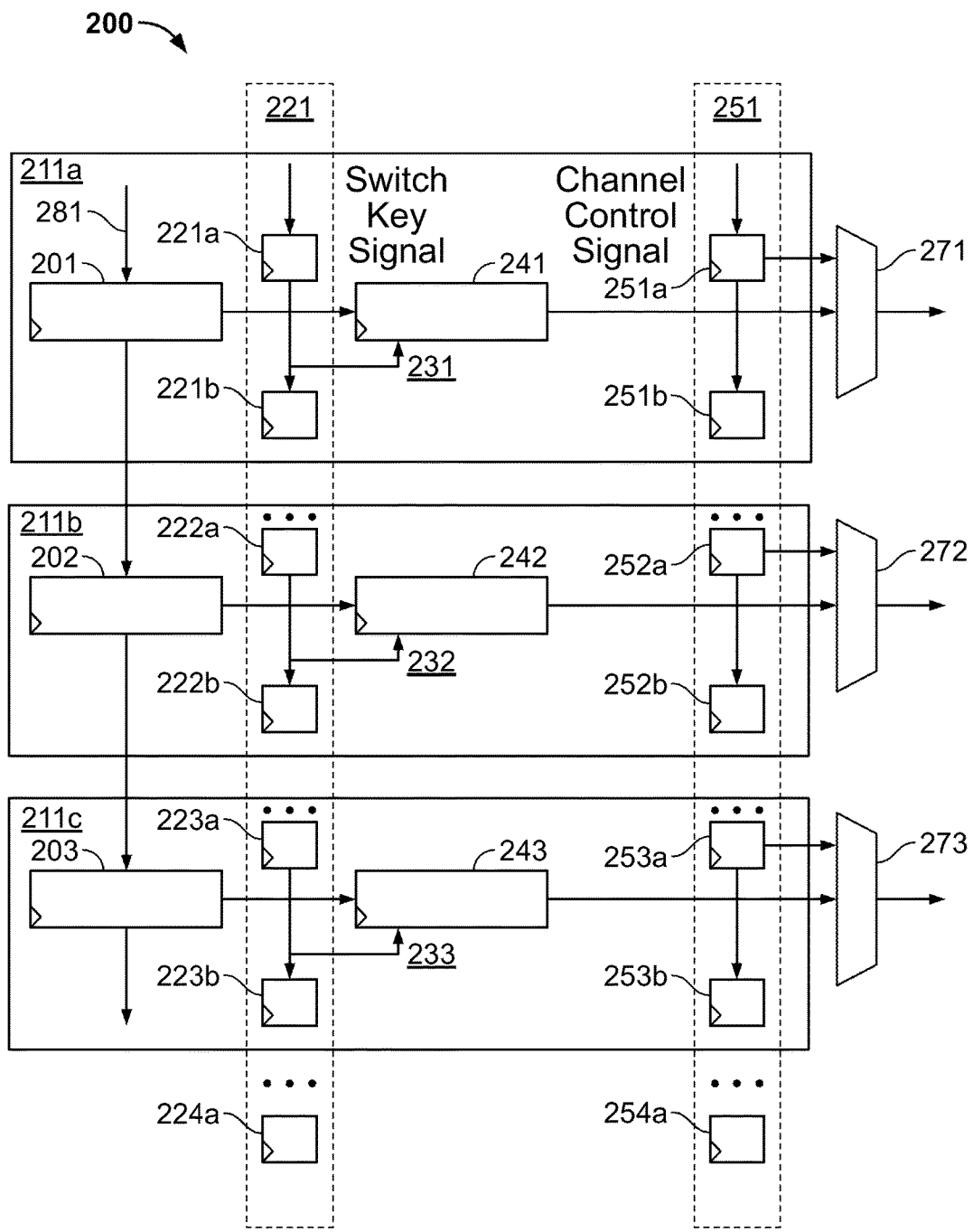
FIG. 2 is a simplified block diagram of one possible implementation of an encryption key pipeline block according to some embodiments.

FIG. 2 is a simplified block diagram of one possible implementation 200 of an encryption key pipeline block according to some embodiments. This exemplary implementation may be used to implement one or more key stage circuitries such as key stage circuitries 111, 112, and 113 of FIG. 1 to provide round keys to process data from a particular channel. Implementation 200 includes staged key storage circuitries 201, 202, and 203, working key storage circuitries 241, 242, and 243, and selection circuitries 271, 272, and 273. These components are arranged in a plurality of round key provider circuitries 211a, 211b, and 211c that may correspond to at least portions of key stage circuitries 111, 112, and 113 of FIG. 1, respectively. A structure similar to structure 200 may be used to provide round keys for each channel. Selection circuitries 271, 272, and 273 may correspond to selection circuitries 121, 122, 123 of FIG. 1, respectively. The same or different circuitries may be used to implement each of channel key provider circuitries 111a, 111b, and 111c of FIG. 1.

To control the flow of encryption key values in the encryption key pipeline block, illustrative implementation 200 includes two control pipelines: channel control pipeline 251 and key control pipeline 221. Each pipeline may be formed using a cascade of components through which a corresponding control signal propagates. For example, illustrated channel control pipeline 251 has a cascade of register circuitries, of which register circuitries 251a, 251b, 252a, 252b, 253a, 253b, and 254a are shown. Similarly, key control pipeline 221 has a cascade of register circuitries, of which register circuitries 221a, 221b, 222a, 222b, 223a, 223b, and 224a are shown.

Channel control pipeline 251 propagates a channel control signal from register circuitry 251a down the cascade of register circuitries. This channel control signal may be implemented as a logic high or low, a binary '1' or '0', a symbol value, or any value for communicating change of channel and/or identify a particular channel from a group of channels. For example, each of selection circuitries 271, 272, and 273 may select the current channel being processed, and there may be a similar structure 200 for each channel. As a result of the propagation of the channel control signal, the corresponding control input of each of selection circuitries 271, 272, and 273 is respectively activated in response to the associated channel control register 251a, 252a, and 253a successively receiving an activated channel control signal. The number of registers in the channel control pipeline 251 may be adjusted as needed, so that the selection circuitries may pass the output of the correct round key provider circuitry 211a, 211b, and/or 211c as appropriate in the context of the corresponding processing round (e.g., in the encryption pipeline 135 of FIG. 1).

In some embodiments, working key storage circuitries 241, 242, and 243 store respective working round keys for a particular channel. For example, the first working key in key storage circuitry 241 may correspond to a round encryption key for an $i^{th}$ processing sub-round, upon a data block B being processed in the encryption pipeline. The data block B being processed may come from a particular channel, e.g., the first channel a. The second working key in key storage circuitry may correspond to a round encryption key for a later, $j^{th}$ round of processing upon data block B (j is a positive integer greater than i). For example, the first working key may be provided to processing round (or sub-round) 143 of FIG. 1 as a round key (or subkey) for a first AES round in the encryption pipeline, and the second working key may be provided to sub-round 146 of FIG. 1 as a round key for a second AES round.

Parallel to working key storage circuitries 241, 242, and 243, staged key storage circuitries 201, 202, and 203 store respective staged round keys. For example, the first staged key in staged key storage circuitry 201 may correspond to a round encryption key for an $i^{th}$ round of processing upon a data block B' of data, incoming from the same channel as data block B. The second staged key in staged key storage circuitry 202 may correspond to a round encryption key for a $j^{th}$ round of processing for data block B'. Typically, channels may be selected through selection circuitries 271, 272, 273, e.g., every clock cycle, but round keys may be changed infrequently. After a key (i.e., set of round keys) is moved from the staged key storage circuitries (201, 202, and 203) to the working key storage circuitries (241, 242, and 243), then the next key (i.e., the next set of round keys) may be expanded and loaded into the staged key storage circuitries.

Using key control pipeline 221, staged round keys are successively switched into working round keys at a corresponding appropriate time. For example, each staged key stored in a staged key storage circuitry 201, 202, and 203 is successively moved to a respective working key storage circuitry 241, 242, and 243, at an appropriate switching time. To ensure that this key switch is performed at the right time, an active switch key signal is input at key control register circuitry 221a, and propagated down the cascade of key control register circuitries 221b, 222a, 222b, 223a, 223b, until 224a. The switch key signal may be implemented similarly to the channel control signal of channel control pipeline 251, e.g., using a logic high or low, a binary '1' or '0', a symbol value, or any value for communicating change of key. The propagated activated signal value is input at control inputs 231, 232, and 233, respectively, as the switch key value propagates down the key control pipeline 221. In this way, an appropriate round key is successively stored in working key storage circuitries 241, 242, and 243, by the time the encryption pipeline needs this round key. A length of the key control pipeline 221 may be determined to match the depth of the encryption pipeline, such as encryption pipeline 135 of FIG. 1. In this way, a key is switched from being a staged key to being a working key in a timing that matches that of the encryption pipeline.

Implementation 200 may include a key round generator module (not shown) for performing the key expansion routine of the AES algorithm to provide the round keys to the staged key storage circuitries. The key round generator may take a cipher key and perform the key expansion routine to generate a key schedule. For example, the key round generator may generate 15 different round keys in the case where 14 rounds are required (one additional round key is typically required for an initial round key addition transformation). Such a key round generator may be implemented in software and/or hardware. For example, one hardware implementation technique implements the key expansion of the generator using a rotation of bytes in a subset of the key, "SubBytes," a sequential XORing of words in the key, and a possible addition of a variable to one of the bytes. Other implementations are possible.

Register circuitries 201, 202, 203, 241, 242, and are any suitable circuitries configured for holding the round keys. For example, registers 201, 202, 203, 241, 242, and 243 may be simple dual-port RAMs. They can also all be replaced by a single multi-port RAM with one write port and C read ports, but as this may be expensive or unavailable in some circuits, they may be implemented on multiple parallel RAMs.

Figure 3:
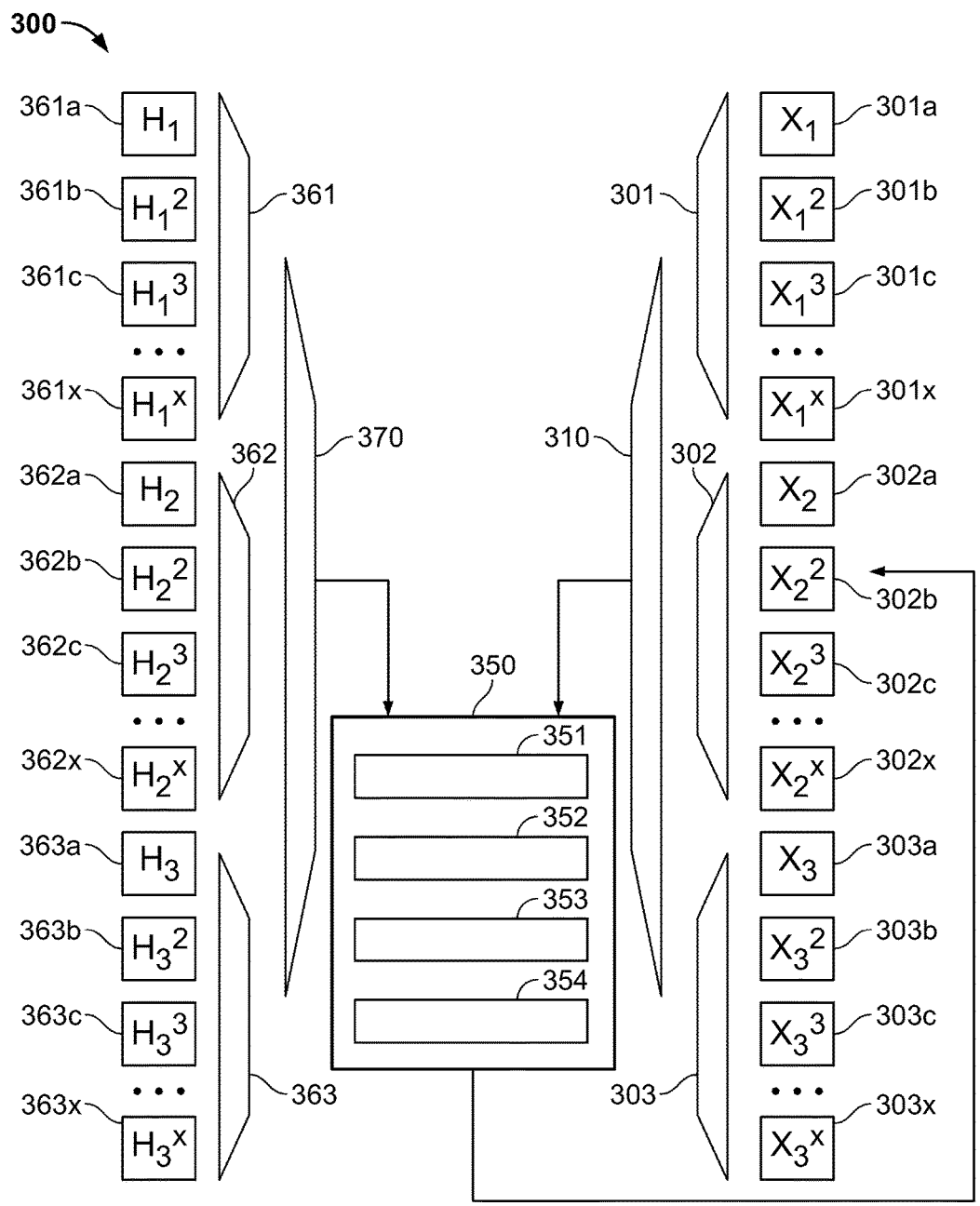
FIG. 3 is a simplified block diagram of one possible implementation of an authentication key pipeline block according to some embodiments.

FIG. 3 is a simplified block diagram of one possible implementation 300 of an authentication key pipeline block according to some embodiments. FIG. 3 describes authentication using a number x of virtual channels for data incoming from 3 physical channels a, b, and c. This exemplary implementation may be used to implement authentication key pipeline block 170 of FIG. 1. Implementation 300 includes an authentication pipeline processing block 350 for combining channel values H and hash values X as explained in more detail below, to generate an authentication tag value. As shown on the right, implementation 300 includes register circuitries 301a, 301b, 301c, through 301x, register circuitries 302a, 302b, 302c, through 302x, and register circuitries 303a, 303b, 303c, through 303x, for providing hash values X and powers thereof. As shown on the left, implementation 300 includes register circuitries 361a, 361b, 361c, through 361x, register circuitries 362a, 362b, 362c, through 362x, and register circuitries 363a, 363b, 363c, through 363x, for providing channel values H and powers thereof. Implementation 300 includes selection circuitries 301, 302, 303, 361, 362, 363, 310, and 370 to implement selection of an appropriate value from the register circuitries to be input to the authentication pipeline processing block 350.

In some authentication algorithms such as the GCM mode of AES, encrypted data, e.g., generated by AES, is repeatedly processed using a hash function to generate a hash (or pre-tag) value X. This hash function may implement multiplication within a binary Galois field, by a hash subkey value H, which is generally though not necessarily constant during an authentication session. The final hash value X is retained as the authentication tag.

Each authentication operation for generating an intermediate hash (or pre-tag) value X up to (and including) the final authentication tag will be referred to herein as an authentication round. These authentication rounds are represented as authentication rounds 351, 352, 353, and 354 in authentication pipeline processing block 350 of FIG. 3.

In some embodiments, a single hash channel is used. For example, for a single hash channel, the hash value may be computed according to the GMAC authentication function:

$$\text{PreTag} = (((((X_5 H + X_4) H + X_3) H + X_2) H + X_2) H + X_0) \quad \text{(EQ. 1)}$$

where H is the hash subkey value and $X_i$ is the hash value from the $i^{th}$ authentication round of a data block incoming from a particular channel.

In some embodiments, rather than using a single hash channel, multiple, virtual authentication channels may be used. This is based on consolidating tag generation, e.g., by applying Horner's method to EQ. 1 above for authenticating data using double virtual hash channels, as follows:

$$\text{PreTag} = ((X_5 H^2 + X_3) H^2 + X_2) \cdot H^2 + X_4 H^2 + X_2) H^2 + X_0) \cdot H \quad \text{(EQ. 2)}$$

Looking at EQ. 2, one can approach the authentication operation as involving two virtual channels, one with a hash subkey value H and another one with a hash subkey value equal to the square $H^2$ of the hash subkey value H.

The same concept can be extended to more virtual channels, which may call for more involved methods for wrapping up intermediate values. For example, for a quad hash channel, the authentication function may be viewed as follows:

$$\text{PreTag} = (((X_{11} H^4 + X_7) H^4 + X_3) \cdot H^4 + ((X_{10} H^4 + X_6) H^4 + X_2) \cdot H^3 + ((X_9 H^4 + X_5) H^4 + X_1) \cdot H^2 + ((X_8 H^4 + X_4) H^4 + X_0) \cdot H \quad \text{(EQ. 3)}$$

Looking at EQ. 3, one can approach the authentication operation as involving four virtual channels, with hash subkey values H, $H^2$, $H^3$, and $H^4$. The same concept may be applied to a different number x of virtual channels.

Going back to FIG. 3, implementation 300 allows authentication pipeline processing block 350 to assemble the appropriate multiplication operands, e.g., according to at least parts of equation EQ. 1, EQ. 2, and/or EQ. 3 above, in order to generate a final authentication tag. For example, authentication pipeline processing block 350 may receive a hash subkey value $H_1$ from register circuitry 361a, or a $v^{th}$ power $H_1^v$ thereof (v=1, . . . , x) from one of register circuitries 361b, 361c, through 361x, all corresponding to channel a. The authentication pipeline processing block 350 may receive the hash subkey value or power thereof corresponding to the first channel a. The authentication pipeline processing block 350 may combine this received hash subkey value or power thereof with an intermediate hash value $X_1$, received from register circuitry 301a or a power therefor $X_1^x$, also corresponding to the first channel a, using multiplication, adder and any suitable combination circuitry. The same may be done with authentication parameters for a second channel b (using hash subkey value $H_2$, intermediate hash value $X_2$, and/or powers of $H_2$ and/or $X_2$) and a third channel c (using hash subkey value $H_3$ and intermediate hash value $X_3$, and/or powers $H_3$ and/or $X_3$).

In some embodiments, a round robin algorithm may be used to determine the order in which to update the hash values X stored in the register circuitries to the right. For example, the values corresponding to the first channel may be first updated, followed by those corresponding to the second channel, then those corresponding to the third channel. Other algorithms may be used depending, for example, on system and/or user parameters.

In some embodiments, the cryptographic algorithm being used to secure data involves additional inputs, known as tweak values. Tweak values may be added at the beginning and/or end of an encryption pipeline such as encryption pipeline 135 of FIG. 1.

Figure 4:
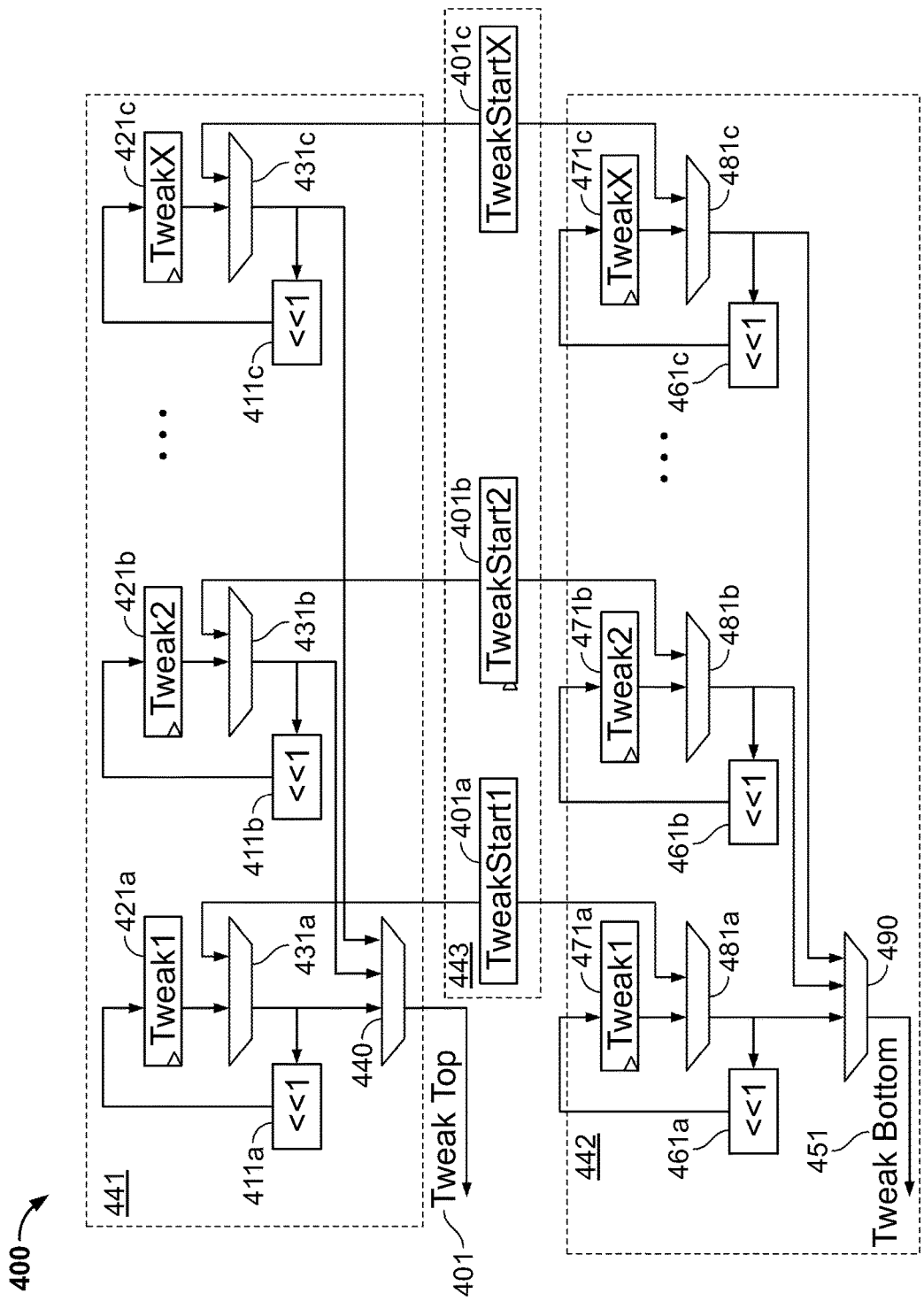
FIG. 4 is a simplified block diagram of one possible implementation of a tweak pipeline block according to some embodiments.

FIG. 4 is a simplified block diagram of one possible implementation 400 of a tweak pipeline block according to some embodiments. The tweak pipeline block may be a part of the encryption key pipeline block or it may be separate. For example, the tweak pipeline block may be coupled to the encryption pipeline to provide tweak values to the encryption pipeline processing block 130 where the encryption pipeline processing block 130 implements a cryptographic algorithm involving tweak values.

As shown, implementation 400 includes a top portion 441, a bottom portion 442, as well as a middle, control portion 443 having tweak control "TweakStart" registers 301a, 301b and 301c. Top portion 441 has tweak register circuitries 321a, 321b, through 321c, shifting circuitries 311a, 311b, through 311c, and selection circuitries 331a, 331b, through 331c. Top portion 441 also includes channel selection circuitry 340 for selecting one of the tweak values corresponding to one of the channels a, b, or c. The selected tweak value is provided as tweak top value 301. Bottom portion 442 has a similar implementation as top portion 441 but outputs tweak bottom value 351.

To provide the appropriate tweak values, both with respect to what particular round of processing a data block is undergoing as well as what particular channel the data block corresponds to, a control mechanism is provided by control portion 443. As shown, a tweak control signal is communicated from tweak control register 301a to the selection circuitry 331a to control when the tweak value stored in register 321a is updated by shifting circuitry 311a. Shifting circuitry 311a may multiply the tweak value stored in tweak register 321a by 2, and map the resultant value back to the appropriate Galois finite field. Shifting circuitry 311 may be implemented using any suitable circuitry, including memory, registers, multipliers, look-up tables, XOR operations, etc. Through the tweak control signal, the tweak values are updated to correspond to the appropriate processing round. In addition, selection circuitry 340 selects the tweak values corresponding to one of the channels, such as channel a (from selection circuitry 331a), channel b (from selection circuitry 331b) and channel c (from selection circuitry 331c). In this way, the architecture shown in FIG. 4 provides the tweak values in a way compatible with the pipelining depth of the encryption pipeline, e.g., of encryption pipeline 135 of FIG. 1.

Bottom portion 442 has a similar implementation as top portion 441 but outputs tweak bottom value 351. The same round and channel control processes used in top portion 441 may be used in bottom portion 442 so that selection circuitries 381a, 381b, through 381c and selection circuitry may control the tweak value updates and the channel selection as described with reference to the top portion 441.

Figure 5:
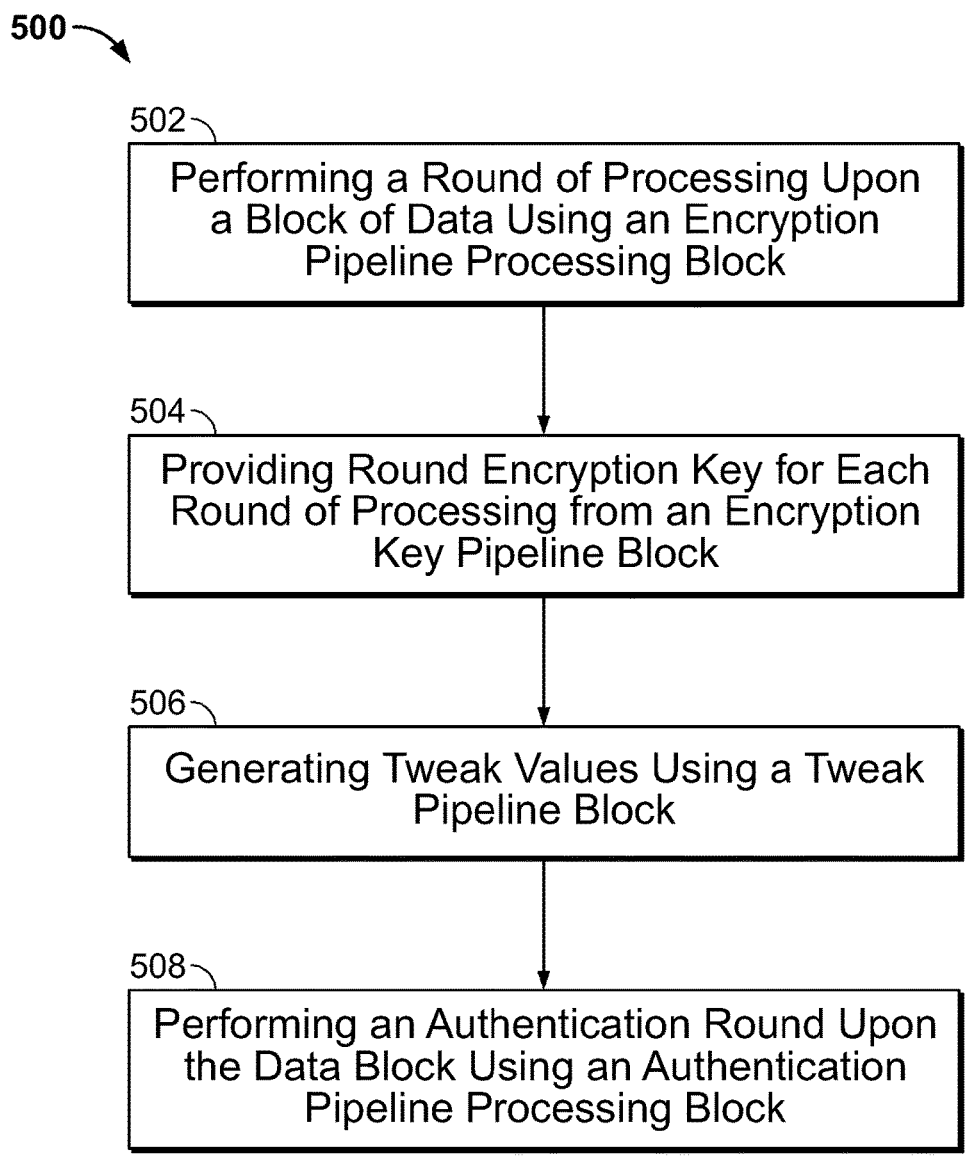
FIG. 5 is a flowchart depicting a process for processing data, according to some embodiments.

FIG. 5 is a flowchart depicting a process 500 for processing data, according to some embodiments. Process 500 may be used to process data incoming from at least a first channel and a second channel, using any of the encryption, authentication, and/or tweak circuitries described above.

At 502, a round of processing upon a block of data is performed using an encryption pipeline processing block. The encryption pipeline processing block may receive a respective round encryption key for each round of processing upon said block of data.

At 504, the respective round encryption key is provided for each round of processing upon said block of data from an encryption key pipeline block. The providing may include selecting, for each round of processing, the respective round encryption key from at least a first round encryption key corresponding to the first channel and a second round encryption key corresponding to the second channel.

In some implementations, a width of the encryption key pipeline block may correspond to a total number of channels from which data is incoming. Additionally or alternatively, a length of the encryption key pipeline block may correspond to a total number of rounds of processing of the block of data.

In some implementations, the encryption key pipeline block includes a first selection circuitry corresponding to the first channel and having a first control input; a second selection circuitry corresponding to the second channel and having a second control input; and a channel control pipeline for propagating a channel control signal to the first control input of the first selection circuitry in a first stage and to the second control input of the second selection circuitry in a second stage.

At 506, tweak values are generated using a tweak pipeline block. For example, a first tweak value corresponding to the first channel and a second tweak value corresponding to the second channel are provided. A first tweak storage circuitry may be configured for storing the first tweak value. A second tweak storage circuitry may be used for storing the second tweak value. The tweak values may be added at the beginning and/or end of an encryption pipeline such as encryption pipeline 135 of FIG. 1.

At 508, an authentication round is performed upon the data block using an authentication pipeline processing block. This may include receiving a respective round authentication key for each authentication round, and providing, using an authentication key pipeline block, the respective round authentication key for each authentication round. In some implementations, this providing is done by selecting, for each authentication round, the respective round authentication key from at least a first round authentication key corresponding to the first channel and a second round authentication key corresponding to the second channel.

In some implementations, at 508, the authentication key pipeline block provides hash information corresponding to the first channel using a first set of storage circuitries and provides hash information corresponding to the second channel using a second set of storage circuitries.

It should be understood that process 500 is only illustrative and not limiting and that various modifications may be made without departing from the scope of this disclosure. For example, while operations are depicted in FIG. 5 in a particular order, this should not be understood as requiring that such operations be performed in the particular order shown or in sequential order, or that all illustrated operations be performed, to achieve desirable results. In certain circumstances, multitasking, parallel processing, and/or rearranging the operations may be advantageous. For example, in some implementations, only encryption is implemented without authentication or tweaking. In other implementations, encryption and tweaking are implemented without authentication. In other implementations, only authentication is implemented without encryption or tweaking.

In some embodiments, multiple processing circuits, e.g., cores, may be used to implement the methods and systems described above. For example, a first core may re-use empty processing slots in an encryption pipeline for initializing the encryption pipeline, e.g., with input values such as encryption and authentication keys. A second core may correspond to the actual encryption processing using values provided using the first core. Alternatively, one core may be used to implement the methods and systems described above, for example, using multiple, virtual channels to perform both the initialization and encryption processing. In one implementation, as described in connection with FIG. 3 above, pipelining in the authentication processing of the data may be implemented using two virtual hash channels per physical channel.

In some embodiments, up to N channels may be supported, including physical and virtual channels. In some embodiments, more than N channels may be supported, e.g., by restricting input, by counting inputs or processing rounds, and/or by implementing a feedback mechanism by which the encryption pipeline signals an available or busy status.

Systems and methods described above show how to interleave multiple channels into a single deep pipeline. Because such interleaving may create other issues, such as key swap, tweak swap for zero-latency systems, and hash consolidation, embodiments described herein address these issues through deeply-pipelined cryptographic algorithms and circuitries. For example, methods and systems describe herein support zero-latency packet switchovers for combination encryption and authentication implementations. Methods and systems described herein allow hash consolidation when the number of virtual hashes is different than the number of channels.

Methods and systems disclosed herein may result in relatively small circuitries that may operate at a consistent speed due to the pipelined architecture without feedback loops. Methods and systems disclosed herein may support a number of protocols carrying data in many suitable forms, including protocols involving a pre-determined end of packet points and a random end of packet points.

Another benefit of the methods and systems disclosed herein is supporting multichannel settings, which are becoming increasingly prominent in modern applications. For example, systems and methods described herein may support any number of encryption/authentication channels, any level of encryption pipelining, and/or any level of authentication pipelining. By supporting pipelining and multiplier input structures as described above, systems and methods described herein may support complex logic structure (such as 128-bit Galois Field operations) and customizable multiplier input structures.

Another benefit of the methods and systems disclosed herein is ease of scalability and supporting an architecture having one or more cores. Yet another benefit is increasing flexibility of cryptographic operations to be applied, and allowing a "push-button" encryption design.

Upon a reading of the above disclosure, one of skill in the art familiar with the AES algorithm will be able to implement a similar core architecture for decryption of ciphertext. The same architecture is used with the AES algorithm pipeline having its various processing blocks reversed. Thus, the first transformation step in the pipeline is the inverse of the "add round key" transformation, the second step is the "inverse mix columns" transformation, the third step is the "inverse shift rows" transformation, and the final step is the "inverse substitute bytes" transformation which uses an inverse S-Box. The key round generator basically runs in reverse. One technique would be to calculate all round keys first and then apply them in reverse order.

It will be understood that the foregoing is only illustrative of the principles of the invention, and that various modifications can be made by those skilled in the art without departing from the scope and spirit of the invention. For example, the various elements of this invention can be provided on in a fixed logic device, or can be configured into a programmable integrated circuit device such as a programmable logic device (PLD) in any desired number and/or arrangement. For example, it should be understood that embodiments of the present invention may be used in numerous types of integrated circuits, including field programmable gate array device (FPGAs), programmable logic devices (PLDs), complex programmable logic devices (CPLDs), programmable logic arrays (PLAs), digital signal processors (DSPs) and application specific integrated circuits (ASICs). One skilled in the art will appreciate that the present invention can be practiced by other than the described embodiments, which are presented for purposes of illustration and not of limitation, and the present invention is limited only by the claims that follow.

What is claimed is:

1. Circuitry for processing data incoming from at least a first channel and a second channel, said circuitry comprising:
   an encryption pipeline processing block for performing a plurality of rounds of processing upon a block of said data using an encryption process, said encryption pipeline processing block receiving a respective round encryption key for each round of processing upon said block of data; and
   an encryption key pipeline block for providing said respective round encryption key for each round of processing upon said block of data, said providing comprising for each round of processing:
      providing at least a first round encryption key corresponding to the first channel and a second round encryption key corresponding to the second channel, and
      selecting the respective round encryption key from the at least first and second round encryption keys.

2. The circuitry for processing data of claim 1, wherein a width of the encryption key pipeline block corresponds to a total number of channels from which data is incoming and a length of the encryption key pipeline block corresponds to a total number of the plurality of rounds of processing of said block of data.

3. The circuitry for processing data of claim 1, wherein the encryption key pipeline block comprises:
   a first selection circuitry corresponding to the first channel and having a first control input;
   a second selection circuitry corresponding to the second channel and having a second control input; and
   a channel control pipeline for propagating a channel control signal to the first control input of the first selection circuitry in a first stage and to the second control input of the second selection circuitry in a second stage.

4. The circuitry for processing data of claim 3, wherein the encryption key pipeline block comprises:
   a first working key storage circuitry for storing a first working key and a second working key storage circuitry for storing a second working key;
   a first staged key storage circuitry for storing a first staged key and a second staged key storage circuitry for storing a second staged key; and
   a key control pipeline for propagating a key switch control signal for propagating the first staged key from the first staged key storage circuitry into the first working key storage circuitry at a first switching time and propagating the second staged key from the second staged key storage circuitry into the second working key storage circuitry at a second switching time.

5. The circuitry for processing data of claim 1, further comprising:
   an authentication pipeline processing block for performing authentication rounds upon said data block, said authentication pipeline processing block receiving a respective hash key value for each authentication round upon said data block; and
   an authentication key pipeline block for providing said respective hash key value for each authentication round upon said data block, said providing comprising selecting, for each authentication round, the respective hash key value from at least a first hash key value corresponding to the first channel and a second hash key value corresponding to the second channel.

6. The circuitry for processing data of claim 5, wherein the authentication key pipeline block comprises a first set of storage circuitries for storing a plurality of powers of a first hash key value corresponding to the first channel and a second set of storage circuitries for storing a plurality of powers of a second hash key value corresponding to the first channel.

7. The circuitry for processing data of claim 1, further comprising:
   a tweak pipeline block for generating a first tweak value corresponding to the first channel and a second tweak value corresponding to the second channel;
   a first tweak storage circuitry for storing the first tweak value; and
   a second tweak storage circuitry for storing the second tweak value.

8. A programmable logic device configured process data incoming from at least a first channel and a second channel, said programmable logic device comprising:

an encryption pipeline processing block for performing a plurality of rounds of processing upon a block of said data using an encryption process, said encryption pipeline processing block receiving a respective round encryption key for each round of processing upon said block of data; and an encryption key pipeline block for providing said respective round encryption key for each round of processing upon said block of data, said providing comprising for each round of processing:

providing at least a first round encryption key corresponding to the first channel and a second round encryption key corresponding to the second channel, and selecting the respective round encryption key from the at least first and second round encryption keys.

9. The programmable logic device of claim 8, wherein a width of the encryption key pipeline block corresponds to a total number of channels from which data is incoming and a length of the encryption key pipeline block corresponds to a total number of the plurality of rounds of processing of said block of data.

10. The programmable logic device of claim 8, wherein the encryption key pipeline block comprises:

a first selector corresponding to the first channel and having a first control input;

a second selector corresponding to the second channel and having a second control input; and a channel control pipeline for propagating a channel control signal to the first control input of the first selector in a first stage and to the second control input of the second selector in a second stage.

11. The programmable logic device of claim 10, wherein the encryption key pipeline block comprises:

a first working key storage block for storing a first working key and a second working key storage block for storing a second working key;

a first staged key storage block for storing a first staged key and a second staged key storage block for storing a second staged key; and a key control pipeline for propagating a key switch control signal for propagating the first staged key from the first staged key storage block into the first working key storage block at a first switching time and propagating the second staged key from the second staged key storage block into the second working key storage block at a second switching time.

12. The programmable logic device of claim 8, further comprising:

an authentication pipeline processing block for performing authentication rounds upon said data block, said authentication pipeline processing block receiving a respective hash key value for each authentication round upon said data block; and an authentication key pipeline block for providing said respective hash key value for each authentication round upon said data block, said providing comprising selecting, for each authentication round, the respective hash key value from at least a first hash key value corresponding to the first channel and a second hash key value corresponding to the second channel.

13. The programmable logic device of claim 12, wherein the authentication key pipeline block comprises a first set of storage blocks for storing a plurality of powers of a first hash key value corresponding to the first channel and a second set of storage blocks for storing a plurality of powers of a second hash key value corresponding to the first channel.

14. The programmable logic device of claim 12, further comprising:

a tweak pipeline block for generating a first tweak value corresponding to the first channel and a second tweak value corresponding to the second channel;

a first tweak storage block for storing the first tweak value; and a second tweak storage block for storing the second tweak value.

15. A method of processing data incoming from at least a first channel and a second channel, said method comprising:

performing, at an encryption pipeline processing block, a plurality of rounds of processing upon a block of said data using an encryption process;

receiving a respective round encryption key for each round of processing upon said block of data; and providing, at an encryption key pipeline block, said respective round encryption key for each round of processing upon said block of data, said providing comprising for each round of processing:

providing at least a first round encryption key corresponding to the first channel and a second round encryption key corresponding to the second channel, and selecting the respective round encryption key from the at least first and second round encryption keys.

16. The method of claim 15, wherein a width of the encryption key pipeline block corresponds to a total number of channels from which data is incoming and a length of the encryption key pipeline block corresponds to a total number of the plurality of rounds of processing of said block of data.

17. The method of claim 15, wherein the encryption key pipeline block comprises:

a first selector corresponding to the first channel and having a first control input;

a second selector corresponding to the second channel and having a second control input; and a channel control pipeline for propagating a channel control signal to the first control input of the first selector in a first stage and to the second control input of the second selector in a second stage.

18. The method of claim 17, wherein the encryption key pipeline block comprises:

a first working key storage block for storing a first working key and a second working key storage block for storing a second working key;

a first staged key storage block for storing a first staged key and a second staged key storage block for storing a second staged key; and a key control pipeline for propagating a key switch control signal for propagating the first staged key from the first staged key storage block into the first working key storage block at a first switching time and propagating the second staged key from the second staged key storage block into the second working key storage block at a second switching time.

19. The method of claim 15, further comprising:

performing, at an authentication pipeline processing block, authentication rounds upon said data block;

receiving a respective hash key value for each authentication round upon said data block; and providing, at an authentication key pipeline block, said respective hash key value for each authentication round upon said data block, said providing comprising selecting, for each authentication round, the respective hash key value from at least a first hash key value corresponding to the first channel and a second hash key value corresponding to the second channel.

20. The method of claim 19, wherein the authentication key pipeline block comprises a first set of storage blocks for storing a plurality of powers of a first hash key value corresponding to the first channel and a second set of storage blocks for storing a plurality of powers of a second hash key value corresponding to the first channel.

21. The method of claim 15, further comprising:
generating, at a tweak pipeline block, a first tweak value corresponding to the first channel and a second tweak value corresponding to the second channel;
storing, at a first tweak storage block, the first tweak value; and
storing, at a second tweak storage block, the second tweak value.

\* \* \* \* \*